United States Patent
Moreno et al.

[11] Patent Number: 5,980,051
[45] Date of Patent: Nov. 9, 1999

[54] EXTERNAL REAR-VIEW MIRROR

[75] Inventors: Ricardo Poveda Moreno; Fábio Koiti Anze; Paulo Roberto Milani, all of São Paulo, Brazil

[73] Assignee: Metagal Industria e Comercio Ltda, Diadema-Estado de Sao Paulo, Brazil

[21] Appl. No.: 09/224,472

[22] Filed: Dec. 31, 1998

[30] Foreign Application Priority Data

Jan. 22, 1998 [BR] Brazil .................................. 9802655

[51] Int. Cl.$^6$ ................................................ G02B 7/182
[52] U.S. Cl. ...................... 359/872; 359/873; 359/874; 248/475.1
[58] Field of Search ................................ 359/872, 871, 359/873, 874, 875, 877; 248/475.1, 476, 477, 478, 479, 496

[56] References Cited

U.S. PATENT DOCUMENTS

| | | | |
|---|---|---|---|
| 5,274,505 | 12/1993 | Nagayama et al. | 359/874 |
| 5,793,543 | 8/1998 | Kimura et al. | 359/875 |
| 5,838,507 | 11/1998 | Boddy et al. | 359/877 |

FOREIGN PATENT DOCUMENTS

| | | |
|---|---|---|
| 9301058 | 5/1993 | Brazil . |
| 7400425 U | 3/1994 | Brazil . |
| 7201917 U | 5/1994 | Brazil . |

*Primary Examiner*—Cassandra Spyrou
*Assistant Examiner*—Mohammad Sikder
*Attorney, Agent, or Firm*—Michael J. STriker

[57] ABSTRACT

An external rearview mirror for automobile vehicles comprising a mirror plate, a regulating mechanism for positioning of said mirror plate, a casing accommodating said mirror plate and said regulating mechanism, a base supporting said casing and placeable on a side of an automotive vehicle, a tilting mechanism for tilting said casing which accommodates said mirror plate and said regulating mechanism and for stabilization of said casing in a position of use and in a tilted position, means for joining said casing with relation to said base around substantially vertical axis, a device for stabilization of said casing in the position of use and in the tilted position, and positioning elements including a support and a connection surface for said support provided in said casing and in said base correspondingly so as to ensure a locking pressure between a base flange and a structural element of the casing.

5 Claims, 5 Drawing Sheets

EXTERNAL REAR-VIEW MIRROR

BACKGROUND OF THE INVENTION

The present invention relates to external rearview mirrors and more particularly to a device for tilting and stabilization of external rearview mirrors of vehicles.

External rearview mirrors of automotive vehicles are known. The external rearview mirror usually includes a mirror plate, a setting device for positioning the plate of the mirror and actuatable directly or through a lever, a button and the like inside the vehicle, a casing which houses the plate and the adjustment mechanism, a base placed on a side of the vehicle and supporting the casing, and a mechanism for tilting of the casing relative to the base. This device is designed to comply with legal requirements. The safety device maintains the casing in the position of use even if it is subjected to typical vibrations during displacement of the vehicle, to reaction of the air displacement acting in the back front of the casing, and to the impact at the back front of the casing until certain safety limits. When the external rearview mirror collides against an obstacle, it also allows tilting of the casing when the impact surpasses a predetermined impact force. The mechanism of tilting with the safety device is disclosed for example in the patent documents MU 7201917, MU 7400425 and PI 9301058 of the applicant. The first two references disclose mechanisms in which a connection between the casing and the base is formed by helical springs which are selected to maintain the casing in the position of use and to allow the casing to tilt relative to the base when it is subjected to an impact. The third reference discloses a more developed tilting system, in which the casing can tilt and remain in a tilted detent position. This system corresponds to legal safety requirements and specifications, and is very useful for a customer since in places with a reduced space of parking and also for prevention of an impact which can damage the mirror, the mirror can be tilted to a position abutting against a side of the vehicle so as to avoid the above mentioned inconveniences. While this system is more advanced than the systems disclosed in the first two references, it is however relatively more complex and is produced by a more complicated and expensive manufacturing process.

SUMMARY OF THE INVENTION

Accordingly, it is an object of the present invention to provide an external rearview mirror which has a safety mechanism for tilting and stabilization and at the same time provides a detent function.

It is another object of the present invention to provide an external rearview mirror in which the tilting mechanism and the device for detent has a simple construction and is easy to manufacture, and at the same time adequately complies with safety needs and legislation requirements.

In keeping with these objects and with others which will become apparent hereinafter, one feature of present invention resides, briefly stated, in an external rearview mirror which has a device for tilting and stabilization, in which a casing which contains a plate of the mirror and a regulating mechanism is joined by a joint relative to a base around an X geometric axis which is substantially vertical, a device for stabilization of the casing in the position of use or tilted position which includes a resilient element, preferably a locking flange projecting from a front of the base and turned to an extremity of the casing, and an element which can be formed as a second resilient flange directed to the base and cooperating with the first flange in locking of the casing in the position of use or blocking in the detent position, with the flange and the element of the structure located oblique or orthogonal relative to the X geometric axis of point of support of the casing, and positioning elements formed as supports and cooperating connection surfaces to ensure the locking pressure between the flange and the element.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
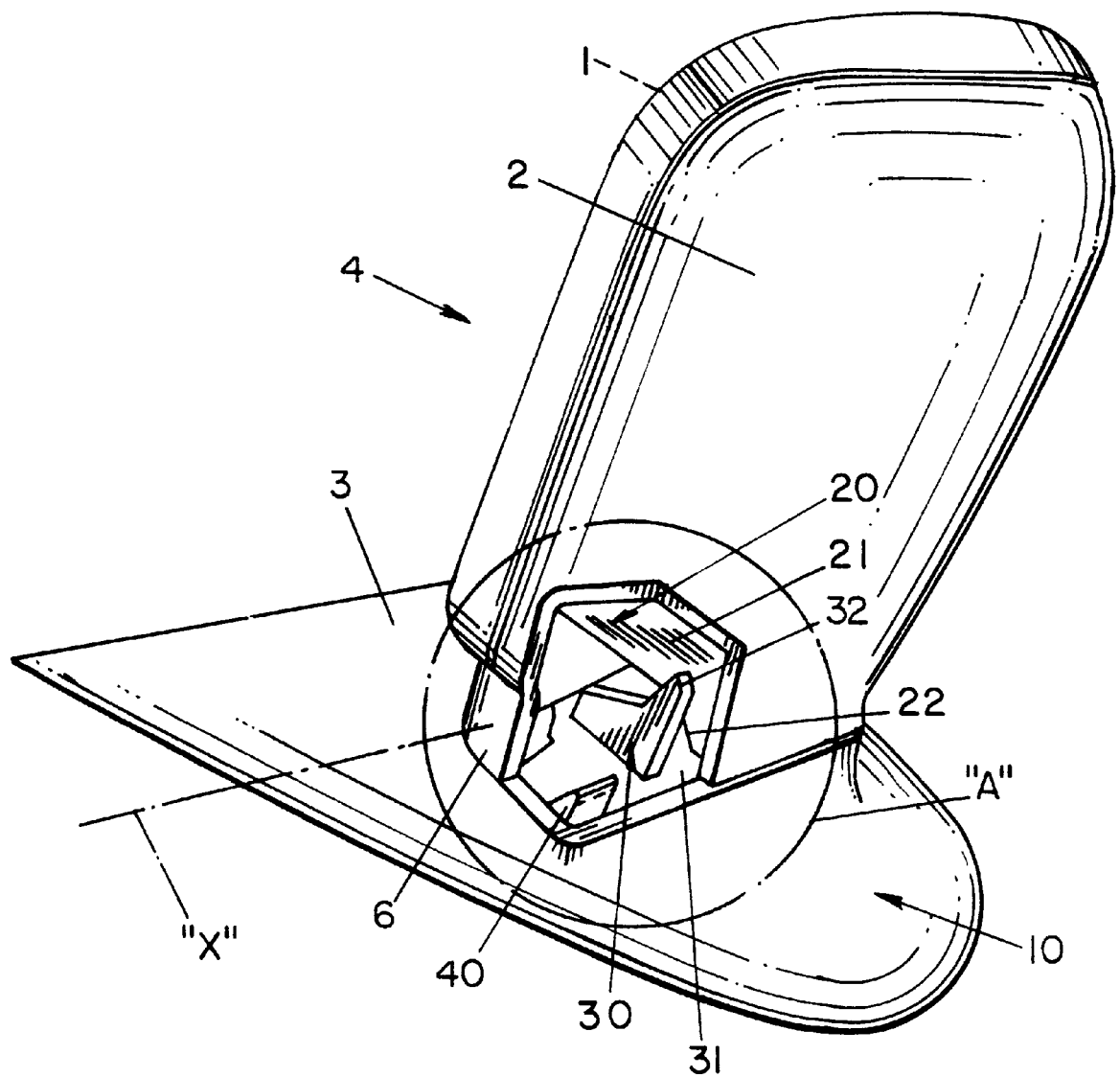
FIG. 1 is a schematic view showing an external rearview mirror with a tilting device in accordance with the present invention, in the position of use.
Figure 2A:
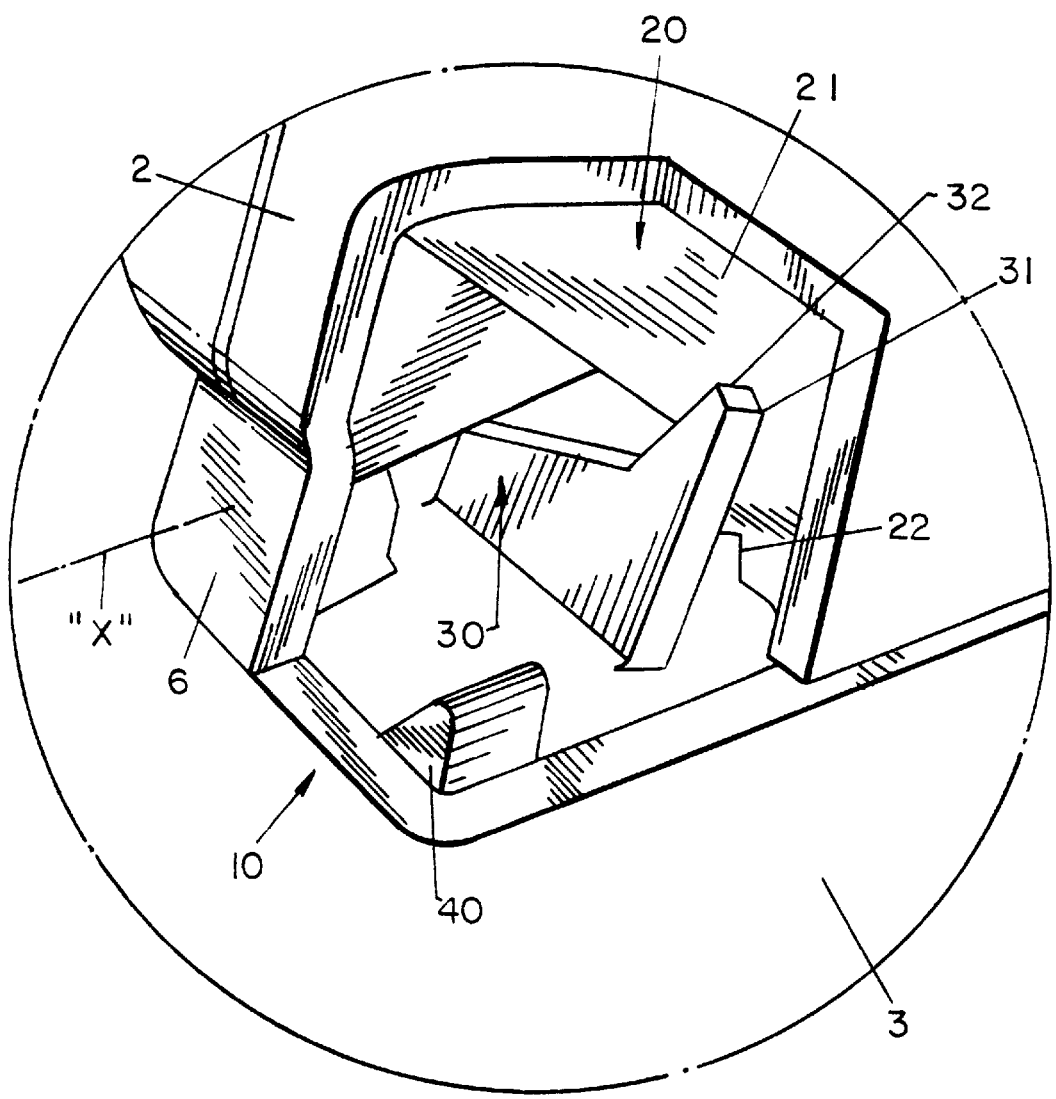
FIG. 2 is a view showing a fragment identified with reference A in FIG. 1 on an enlarged scale.
Figure 3:
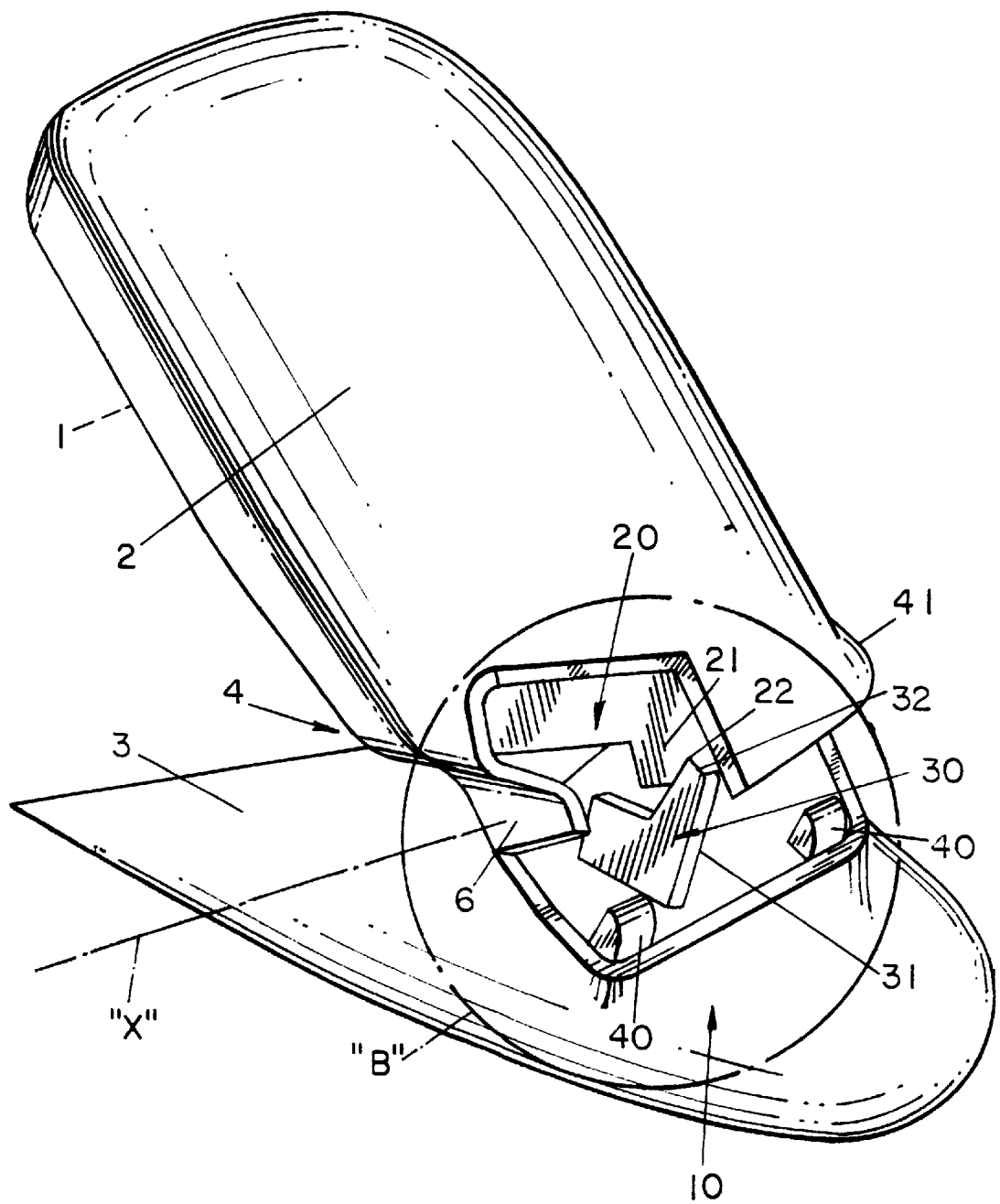
FIG. 3 is a view substantially corresponding to the view of FIG. 1 but showing the inventive external rearview mirror in a tilted position.
Figure 4B:
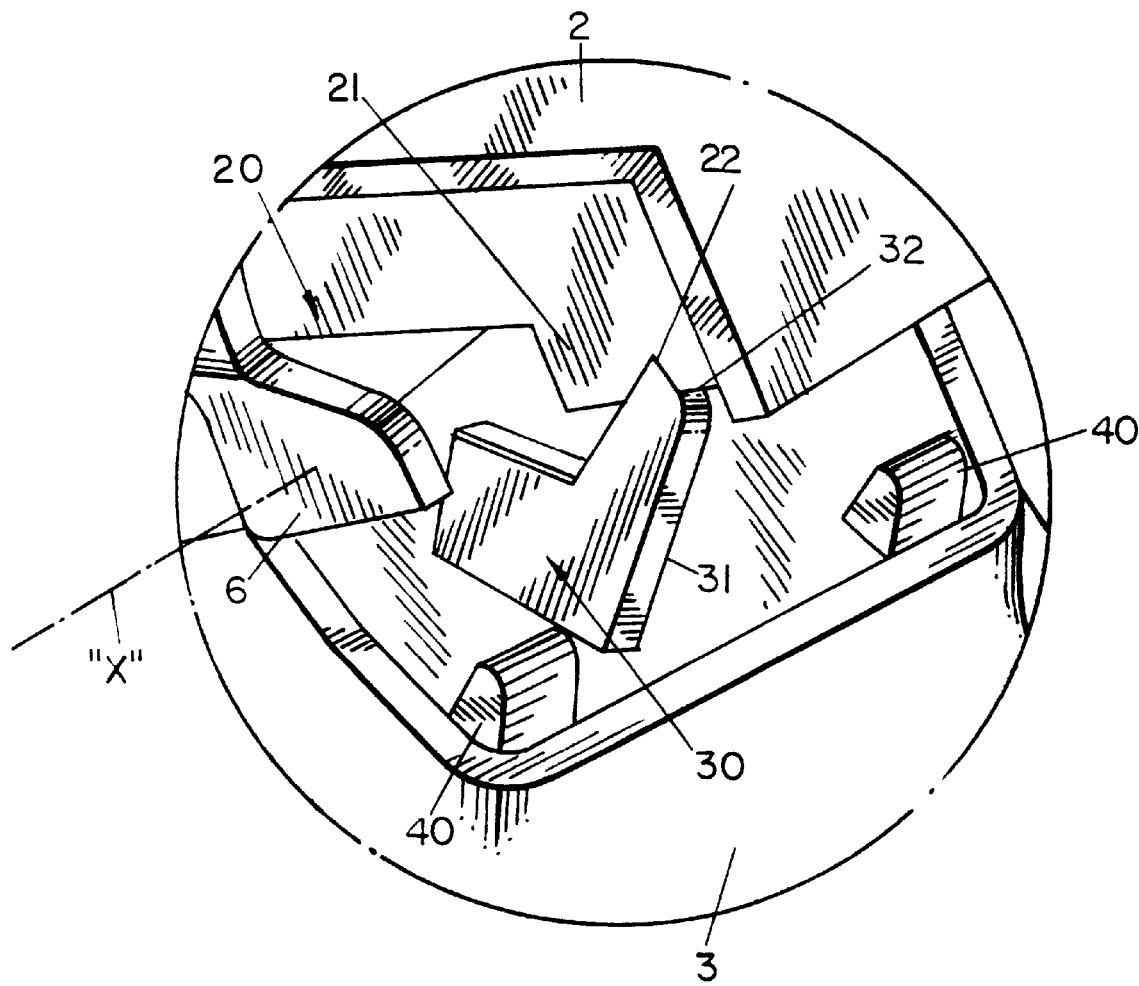
FIG. 4 is a view showing a fragment identified with reference B in FIG. 3, on an enlarged scale.
Figure 5:
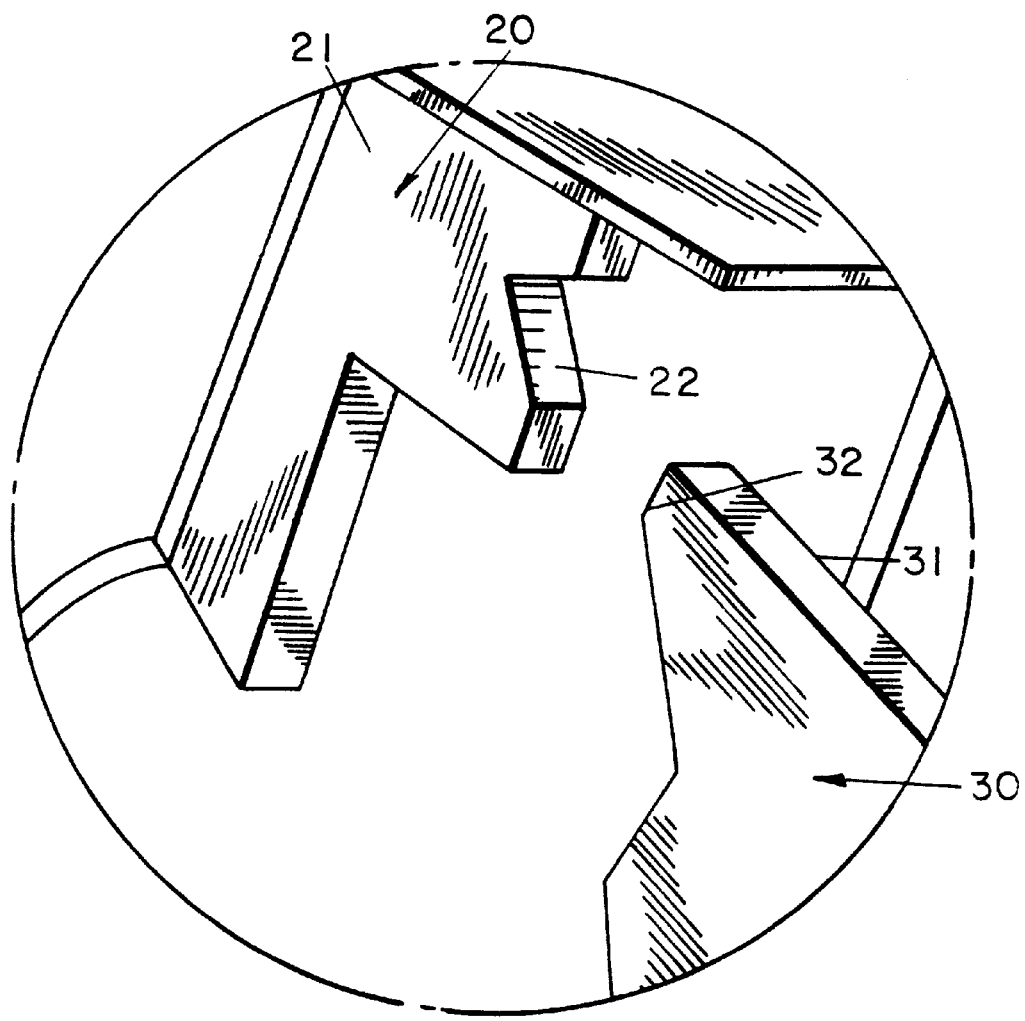
FIG. 5 is a view showing an enlarged detail of the tilting mechanism.

An external rearview mirror for automotive vehicles in accordance with the present invention has a mirror plate 1. It further has a device for adjusting a position of the mirror plate 1 which is activated by a direct actuation or through an internal lever mechanically or a button automatically from the vehicle. A casing 2 accommodates the mirror plate 1 the adjusting mechanism. A base 3 supports the casing 2 which accommodates the mirror plate 1 and the regulating device. The base can be arranged on a side of the automotive vehicle. The external rearview mirror is further provided with a mechanism 4 for tilting the casing 2 which accommodates the mirror plate 1 and the adjusting mechanism, with relation to the base 3, and for stabilization of the casing 2 in the position of use and in a tilted position. In the position of use the casing is orthogonal with relation to the side of the vehicle, while in the tilted position it is displaced against the side of the vehicle. The casing 2 and the base 3 are composed of thermoplastic materials.

The mechanism 4 for tilting and stabilization includes joint means 6 for joining the casing 2 accommodating the mirror plate 1 and the adjusting device with relation to the base 3 around an X geometric axis, which is substantially vertical. The mechanism 4 further includes a device 10 for stabilization of the casing 2 in the position of use and in the tilted position. The device 10 has a resilient element, preferably a lock flange 30 projecting from a front of the base 3 and turned to the extremity of the casing 2, and a structural element 20 which can be formed as a second resilient flange located in the extremity of the casing 2 and turned to the base 3. The flange 30 and the element 20 are located in planes which are at least oblique or ideally orthogonal with relation to the X geometric axis of a point of support of the casing 2, substantially in line. They can be formed of the same material and of one piece with the base and the casing respectively, and cooperate with one another to lock the casing 2 in the position of use, or to block the casing 2 in the tilted position.

The mechanism 4 is further provided with positioning elements which include supports 40 and corresponding front portions 41 formed of one piece with the casing 2 and the base 3 correspondingly and operating in dependence on the pressure of locking between the base flange 30 and the element 20 of the casing and on the size and weight of the set of the casing 2, the mirror plate 1, and the mechanism of adjustment. The positioning elements ensure the sufficient locking pressure between the flange 30 and the element 20 to maintain the casing in the position of use or to release it for tilting when the user actuates the same.

The flange 30 of the base 3 has at least one front portion 31 which corresponds to a respective front portion 21 of the casing 2. They form locking front portions by interference under pressure of the casing 2 in the base 3 in the position of use of the mirror (orthogonal or lateral of the vehicle). They are formed to provide a sufficient locking to withstand the vibrations and reaction force of the displacement of air in a back front of the casing 2 in the position of use, and the displacement of the vehicle, as well to withstand an eventual impact force in the back front of the casing in the position of use until a predetermined limit and to release the casing 2 to tilt when an impact force exceeds a predetermined strength.

The flange 30 of the base 3 has at least one bumper surface 32 located at an angle with relation to the locking front portion by interference 31. It is located in the trajectory of the corresponding bumper surface 22 of the element 20 of the casing 2. The surfaces 21 and 31 are unlocked during the movement of the casing 2 around the axis X from the tilted position to the use position. The bumper surfaces 32 and 22 form blocking front surfaces of the casing 2 in the tilted position, displaced against the side of the vehicle. They are designed to proportionate a sufficient blocking to bear the force that acts in the front part of the casing 2 and for returning the same to the position of use until a certain predetermined limit.

The bumper surface 32 of the flange 30 of the base 3 and the bumper surface 22 of the element 20 of the casing 2 have profiles, and/or designs relative to one another and a location relative to the X geometric axis of point of support of the casing 2, selected to form a device for unblocking the casing 2 from the tilted position. It is actuated whenever a force above a predetermined limit acts in the front portion of the casing in the sense of returning the same to the position of use, and provides sliding of the bumper surfaces 22 and 32 relative to one another so as to replace the locking surfaces by interference under pressure 31 of the base 3 and 31 of the casing 2 and reconnecting them again by interference.

When the mirror is in the use position perpendicular to the side of the housing, the flange 30 of the base 3 and the element 20 of the casing 2 are connected by interference to provide locking of the casing 2 and consequently of the mirror plate 1 in the position of use. In this condition both the flange 30 and the element 20 or at least the flange 30 is slightly bent due to the locking pressure of the connection surface by interference 21 of the element 20 over the connection surface by interference 31 of the flange 30. Such a locking pressure, assisted if needed by the positioner devices 40, 41 is sufficient to withstand the vibrations to which the set of the mirror is subjected during movement of the vehicle, to withstand a reaction force of the air displacement that acts in the back of the casing 2 during movement of the vehicle and tends to release the casing from the position of use, and to withstand an impact force prescribed by legislation which is applied by an impact at the casing 2 during movement of the vehicle, for instance when the mirror collides with a passerby or other obstacles, so that the integrity of the obstacles and the mirror is protected.

When the mirror collides with an obstacle with an impact force which is a inferior to the predetermined force it remains in the position of use. When it collides with a superior force than predetermined force, a release of the flange 30 and the element 20 occurs, and consequently the set of the casing 2 tilts with relation to the base 3 to the tilted position, displaced ti the side of the vehicle. Thereby the integrity of the impact point is protected, that it is important for a passerby or the mirror. Simultaneously the locking pressure between the flange 30 and the element 20 is released, both flanges or at least the flange 30 of the base 3 deflects and remains coleveled to the element 20 of the casing 2. In this condition the bumper surfaces 22 and 32 are gathered and remain aligned so as to impede a return of the set of casing 2 to the position of use and to retain the tilted position. The same effect is provided when the user of the vehicle intends to decrease its width, to park in a narrow place, and manually forces the set of casing 2 to the tilting position.

When there is a pressure over the front part of the casing 2 that is tilted until a certain limit, the bumper surface 22 of the casing 2 applies a pressure over the bumper surface 32 of the flange 30 of the base 3. However, the set of casing 2 is not unblocked from the tilted position.

In order to return the mirror to the position of use, the user presses the front part of the casing 2 in the tilted position with a force above the mentioned limit, so that the bumper surface 22 of the element 20 presses over the bumper surface 32 of the flange 30 of the base 3. As a result, there is a bending of the flange 30 and the element 20 or at least of the flange 30 and a consequent sliding between the bumper surface 22 and 32 so as to restore the surface connection by interference 21 and 31. Therefore the reconnection by interference of the flange 30 and the element 20 is obtained, and the relocking of the casing set in the position of use is accomplished.

The exterior rearview mirror with the above described device for tilting has a simple construction and easy to manufacture. Also, various modifications are possible.

More than one flange 30 and the corresponding element 20 for locking by interference may be provided, as well as more than one positioning in the elements 40, 41. The flanges 30 and the elements 20 and the positioning elements 40, 41 may have any configurations and the dimensions to ensure adequate locking and blocking. The locking surfaces due to the interference 21 and 31 of the element 20 and the flange 30 may have profiles and/or relative positions and/or surface finishing that ensures functioning of the same.

The bumper surfaces 22 and 33 and the element 20 and the flange 30 can have profiles, relative positions and surface finishing that allow them to work in accordance with the present invention. For example, the bumper surface 22 can be formed by a V cut in the extremity of the flange 20 and the bumper surface 32 can be formed by a tooth in the flange 30, or vice versa. The cut and the tooth can be located to define smooth surfaces at an angle to the locking surfaces due to the interferences 21 and 31, and can be funnel shaped in their directions to the opposite surfaces 21 and 31. The funnel shapes in a direction substantially parallel to the X geometric axis of point of support of the casing 2 in the base 3 can be formed so that when the casing 2 is displaced from the tilted position to the position of use, the strength that is applied to the same is subdivided into a component of tilting of the casing 2 and the component of a relative sliding of the bumper surfaces 22 and 32.

It will be understood that each of the elements described above, or two or more together, may also find a useful application in other types of constructions differing from the types described above.

While the invention has been illustrated and described as embodied in external rearview mirror, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. An external rearview mirror, comprising:
   a mirror plate;
   a regulating mechanism for positioning of said mirror plate;
   a casing accommodating said mirror plate and said regulating mechanism;
   a base supporting said casing and placeable on a side of an automotive vehicle;
   a tilting mechanism for tilting said casing which accommodates said mirror plate and said regulating mechanism, and for stabilization of said casing in a position of use and in a tilted position;
   means for joining said casing with relation to said base around a substantially vertical axis;
   a device for stabilization of said casing in the position of use and in the tilted position, said device including a resilient element formed as a first locking flange projecting from a front of said base and turned to an extremity of said casing, and a structural element formed as a second resilient flange provided in an extremity of said casing and directed to said base and cooperating with said first flange for locking said casing in the position of use or blocking said casing in a returned position, said first locking flange and said structural element being located in a plane selected from a group consisting of an oblique plane or orthogonal plane in relation to said substantially vertical axis of a point of support of said casing; and
   positioning elements including a support and a connection surface for said support provided in said casing and in said base correspondingly so as to ensure a locking pressure between said flange and said structural element.

2. An external rearview mirror as defined in claim 1, wherein said flange and said structural element are composed of a same material and formed of one piece with said base and said casing correspondingly.

3. An external rearview mirror as defined in claim 1, wherein said flange of said base has at least one surface which is coleveled with a respective surface of said casing, said surfaces being provided for locking by interference under pressure of said casing in said base in the position of use and formed to proportionate a locking to withstand vibrations and reaction force of a displacement of air in said housing in the position of use, of a movement of the vehicle and an eventual impact force in said casing in the position of use until a predetermined limit and to release said casing to tilt when an impact force exceeds a predetermined level.

4. An external rearview mirror as defined in claim 3, wherein said flange on said base has at least one bumper surface located at an angle with relation to a locking surface by interference and located in a trajectory of a corresponding bumper surface of said structural element of said casing during unlocking of said surfaces during a movement of said casing around said vertical axis from the tilted position to the position of use, said bumper surfaces forming surfaces of blocking of the casing in the tilted position and are selected to proportionate a blocking to withstand a force that acts in a front portion of said casing and returning to the position of use until a predetermined limit.

5. An external rearview mirror as defined in claim 4, wherein said bumper surface of said base and said bumper surface of said structural element of said casing are formed relative to one another and located relative to said vertical axis of the point of support of said casing so as to form a device for unblocking of said casing from said tilted position when a force above a predetermined force acts in a front portion of said casing in the sense of returning the same to the position of use and to provide a sliding of said bumper surfaces one over the other for restoring blocking surfaces by interference of the base and of the casing to produce a reconnection.

\* \* \* \* \*